US011992817B2

(12) United States Patent
Webb

(10) Patent No.: US 11,992,817 B2
(45) Date of Patent: May 28, 2024

(54) INTEGRATED MOBILE MUD MIXING SYSTEM

(71) Applicant: Dustin Webb, New Waverly, TX (US)

(72) Inventor: Dustin Webb, New Waverly, TX (US)

( * ) Notice: Subject to any disclaimer, the term of this patent is extended or adjusted under 35 U.S.C. 154(b) by 782 days.

(21) Appl. No.: 17/300,024

(22) Filed: Feb. 8, 2021

(65) Prior Publication Data

US 2022/0250012 A1 Aug. 11, 2022

(51) Int. Cl.
*B01F 35/71* (2022.01)
*B01F 35/75* (2022.01)

(52) U.S. Cl.
CPC ...... *B01F 35/711* (2022.01); *B01F 35/71731* (2022.01); *B01F 35/754* (2022.01); *B01F 35/7176* (2022.01)

(58) Field of Classification Search
CPC .. E04G 21/04; B28C 7/00; B28C 7/02; B28C 5/0875; B28C 9/04; B28C 7/0454; B28C 7/044; B28C 9/0454; B28C 7/0418; B28C 7/0422; B28C 7/0477; B28C 7/10; B28C 9/0481; B28C 9/049; B01F 15/0235; B01F 15/00538; B01F 15/00519; B01F 2215/0081; B01F 35/71731; B01F 35/32025; B01F 35/3204; B01F 2101/49; B01F 33/805; B01F 35/71775; B01F 33/823; B01F 35/711; B01F 35/754; B01F 35/7176; B01F 27/112; B01F 33/5023; B01F 25/53; F01D 15/08; F01D 15/10; F02C 3/22; F04B 49/20; F04B 19/22; F04B 17/03; F04B 17/06; F04B 23/00; F04B 47/02; F04B 49/065; H02P 23/00; E21B 43/267; E21B 43/26; E21B 43/2607; B65G 33/18; B65G 47/19; Y02P 70/10
USPC .... 366/14–20, 27–29, 33–35, 64–66, 37–38, 366/31–32, 50–51, 41, 155.1–158.4
See application file for complete search history.

(56) References Cited

U.S. PATENT DOCUMENTS 2,786,651 A 3/1957 Mickle
4,474,254 A * 10/1984 Etter ........................ E21B 21/06 366/136
4,913,554 A * 4/1990 Bragg .................... B01F 33/502 366/132
5,779,355 A * 7/1998 Pullman .................. B01F 23/50 366/173.2
5,896,883 A 4/1999 Khalatbari
7,419,354 B2 9/2008 Zamfes
7,476,318 B1 1/2009 Tibban
8,844,650 B2 9/2014 Saiz
8,936,430 B2 1/2015 Bassett
10,603,644 B1 * 3/2020 Beason ................. B01F 27/191
10,830,009 B2 11/2020 Orban
11,746,276 B2 * 9/2023 Alsahlawi ........... B01F 35/2136 366/136

(Continued)

*Primary Examiner* — Charles Cooley
(74) *Attorney, Agent, or Firm* — Randal Homburg

(57) ABSTRACT

A portable mud mixing system for adding wet or dry components to oilfield drilling mud provides an enclosed mobile platform including at least one mud mixing hopper, at least one mud mixing tank, a suction piping assembly and a discharge piping assembly which blend the additives within the circulating drilling mud into a homogeneous mixture, circulate the mixture, and provide for introduction of the mixture into production, the system providing transfer of the drilling mud and mixture from pre-mix to production in one singular integrated system.

8 Claims, 7 Drawing Sheets

(56) References Cited

U.S. PATENT DOCUMENTS

| | | | | |
|---|---|---|---|---|
| 2008/0264641 | A1* | 10/2008 | Slabaugh | B01F 23/51<br>166/308.2 |
| 2013/0088934 | A1* | 4/2013 | Gouin | B01F 27/88<br>366/282 |
| 2013/0150268 | A1* | 6/2013 | Oldham | C09K 8/62<br>422/162 |
| 2014/0364344 | A1* | 12/2014 | Weinstein | B01F 25/50<br>422/292 |
| 2021/0198994 | A1* | 7/2021 | Christinzio | B01F 35/71775 |
| 2022/0250012 | A1* | 8/2022 | Webb | B01F 35/754 |
| 2023/0077174 | A1* | 3/2023 | Couch | B01F 25/104 |

* cited by examiner

INTEGRATED MOBILE MUD MIXING SYSTEM

CROSS REFERENCE TO RELATED APPLICATIONS

None.

I. BACKGROUND OF THE INVENTION

1. Field of Invention

A portable mud mixing system for adding wet or dry components to oilfield drilling mud provides an enclosed mobile platform including at least one mud mixing hopper, at least one mud mixing tanks, a suction piping assembly and a discharge piping assembly which blend the additives within the circulating drilling mud into a homogeneous mixture, circulate the mixture, and provide for introduction of the mixture into production, the system providing transfer of the drilling mud and mixture from pre-mix to production in one singular integrated system.

2. Description of Prior Art

A preliminary review of prior art patents was conducted by the applicant which reveal prior art patents in a similar field or having similar use. However, the prior art inventions do not disclose the same or similar elements as the present integrated mud mixing system, nor do they present the material components in a manner contemplated or anticipated in the prior art.

A drilling mud reclamation system processes drilling mud and restores the integrity of the drilling mud for recycled use in production, providing a closed loop system to remove cuttings in U.S. Pat. No. 8,844,650 to Saiz. This system includes at least one clean mud mixing tank, at least one pump system, at least one dirty mud shaker and an optional conveyor system to remove the debris, at least one recycled mud reclamation tank and one or more filtering pump or centrifugal system. It does not provide for the addition of wet or dry additives to circulating mud. It is basically a drilling mud filter.

In U.S. Pat. No. 7,476,318 to Tibban, a drilling mud tank provides a mud tank with sloping walls, diverts sinking aggregate to a sand trap at a convergence in the floor of the tank using suction from a sand pump. A center divider separates the mud from a dirty tank to a clean tank for redundant cleaning and aggregate removal.

Etter, U.S. Pat. No. 4,474,254, discloses a portable drilling mud system on a trailer having an upper platform above the trailer containing a mud degassing vessel, a solids separator and an additive blending unit mounted above a tank, with the degassing system retracted and extended using hydraulic cylinders to raise the vessel from a transport position to a working position and back. While Etter includes the mixing component, it does not configure it circulating system nor provide the mixing tank system with the suction piping and discharge piping systems for uniform mixture delivery of the additive into the production end point.

II. SUMMARY OF THE INVENTION

Drilling mud is used in down hole drilling in nearly every oil and gas drilling operation. It is introduced into the drilling operation through the drill stem and the drill bit to provide lubrication for better cutting and heat reductions and to extract and evacuate drilling debris generated from the drilling operation. Over time, several drilling mud additives have been conceived and used depending on the subjective geological formation into which the drilling occurs. Numerous additives are currently on the market, which are blended with the drilling mud in order to continually enhance the efficiency of the drilling operation, which may change throughout the course of a singular drilling operation.

Additives are available for various uses and are supplied in various types. Broad classes of additives are suited for water-based drilling fluids, oil based fluids and synthetic based fluids. Water based additives include:

a) weighting agents to increase the viscosity of drilling fluids;
b) fluid-loss-control additives which require prehydration in fresh water before being added into the drilling fluids;
c) thinners or dispersants to improve fluid-loss control and reduce filter cake thickness;
d) lost-circulation materials, which are fibrous materials, flakes or granular materials to reduce the amount of fluid loss in formations such as sandstones, natural or induced formations fractures and cavernous zones;
e) surfactants or surface-active agents including emulsifiers, dispersants, wetting agents foaming agents or de-foaming agents; and
f) pH control agents, drill-string-corrosion mitigation agents, antibacterials, calcium binders, corrosion inhibitors and lubricants.

In all cases, the additives in the drilling fluids are preferably mixed to a point where the mixtures are homogeneous in consistency. This homogenous quality produces a predictable and consistent drilling and production result.

The primary objective of the present integrated mobile mud mixing system is to provide an on-site mud mixing system, closed from the external and outdoor environment, to enable the subjective mixing of homogenous drilling fluids and additives which are mixed, circulated for homogenous enhancement and site delivery during drilling operations for water based, oil based or synthetic based drilling fluids consistent and directly suited for the geological issues at a precise level of drilling and production as the operation is conducted from initial bore to completion. A secondary benefit is provided by allowing the redundant circulation of the fluids to ensure that all additives requiring pre-mixture and fully hydrated prior to introduction in to the drilling fluids. A third benefit is to provide internal storage at the point of the mixing hopper for bagged drilling additives to avoid exposure to harsh elements which are present in an external environment to allow for ready access stockpiling of the variety of additives forecast in a drilling operation.

III. DESCRIPTION OF THE DRAWINGS

The following drawings are submitted with this utility patent application.

FIG. 6 is a diagram of an embodiment of the discharge piping assembly.

IV. DESCRIPTION OF THE PREFERRED EMBODIMENT

Figure 1:
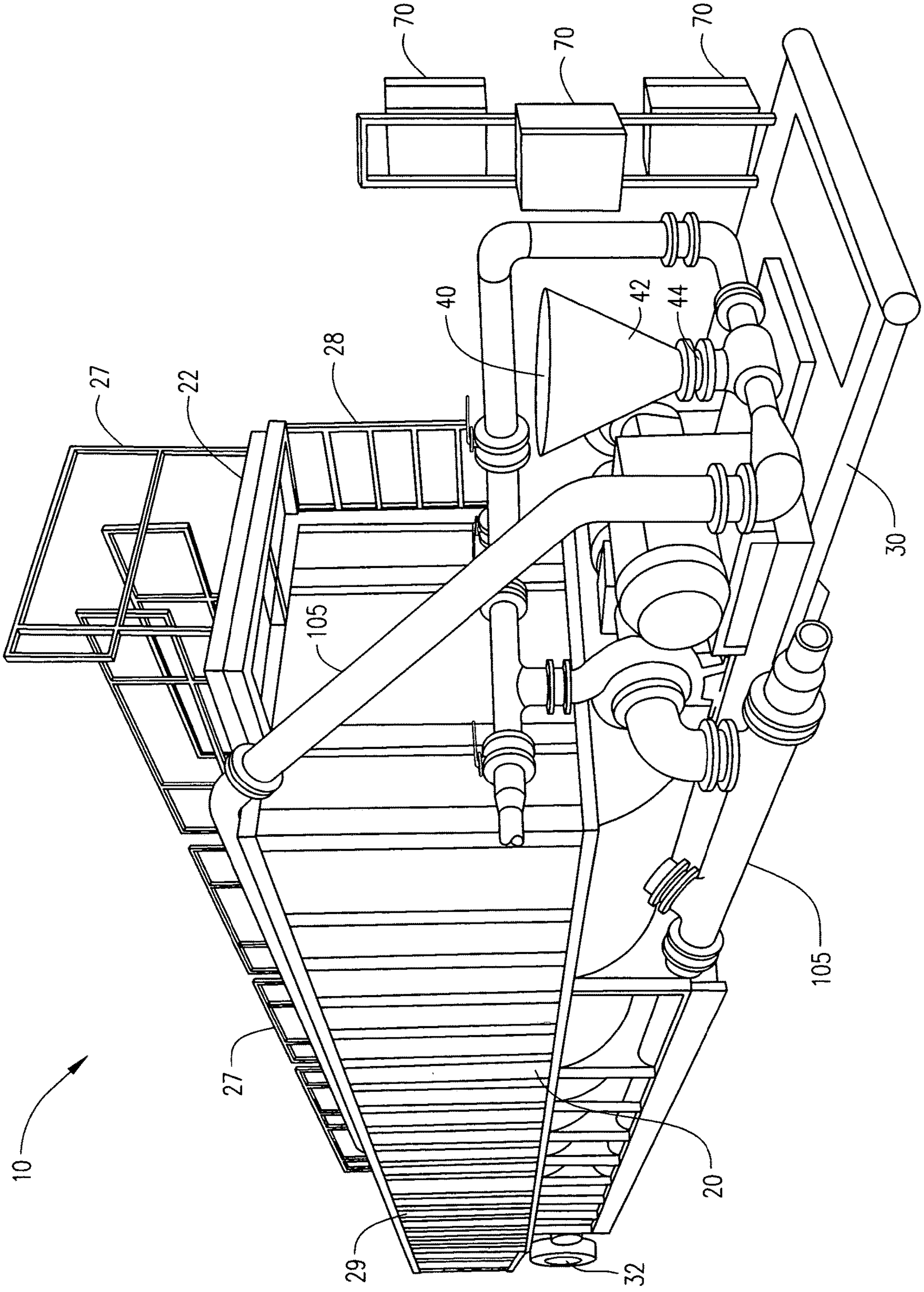
FIG. 1 is a front right side perspective view of the portable mud mixing station.

A portable mud mixing station 10, as shown in FIGS. 1-7 of the drawings, provides a mobile fully-contained platform for mixing and maintaining drilling mud and additives subjectively determined for use in a remote drilling operation, the station 10 providing for a homogeneous and consistent mixture through continual and efficient circulation of the drilling mud and additives. The mixing station provides a mobile platform 20 defining an inner platform floor 21, an upper deck 22 with a catwalk 23 and an upper opening 24, a wet or dry additive hopper 40, a plurality of external inlet and outlet connectors for the introduction and dispensing of drilling fluids and additives, various transfer supply piping 105, at least one mud mixing tank 60, a suction piping assembly 200, a discharge piping assembly 100 and an electrical control center 70 connected to a local electric generator or power supply, further providing electrical wiring to a plurality of valves in the discharge piping assembly 100 and suction piping assembly 200, and various disclosed motors, sectional piping throughout the entire discharge piping assembly 100 and suction piping assembly 200, agitators, and pumps as defined within the station 10.

Figure 2:
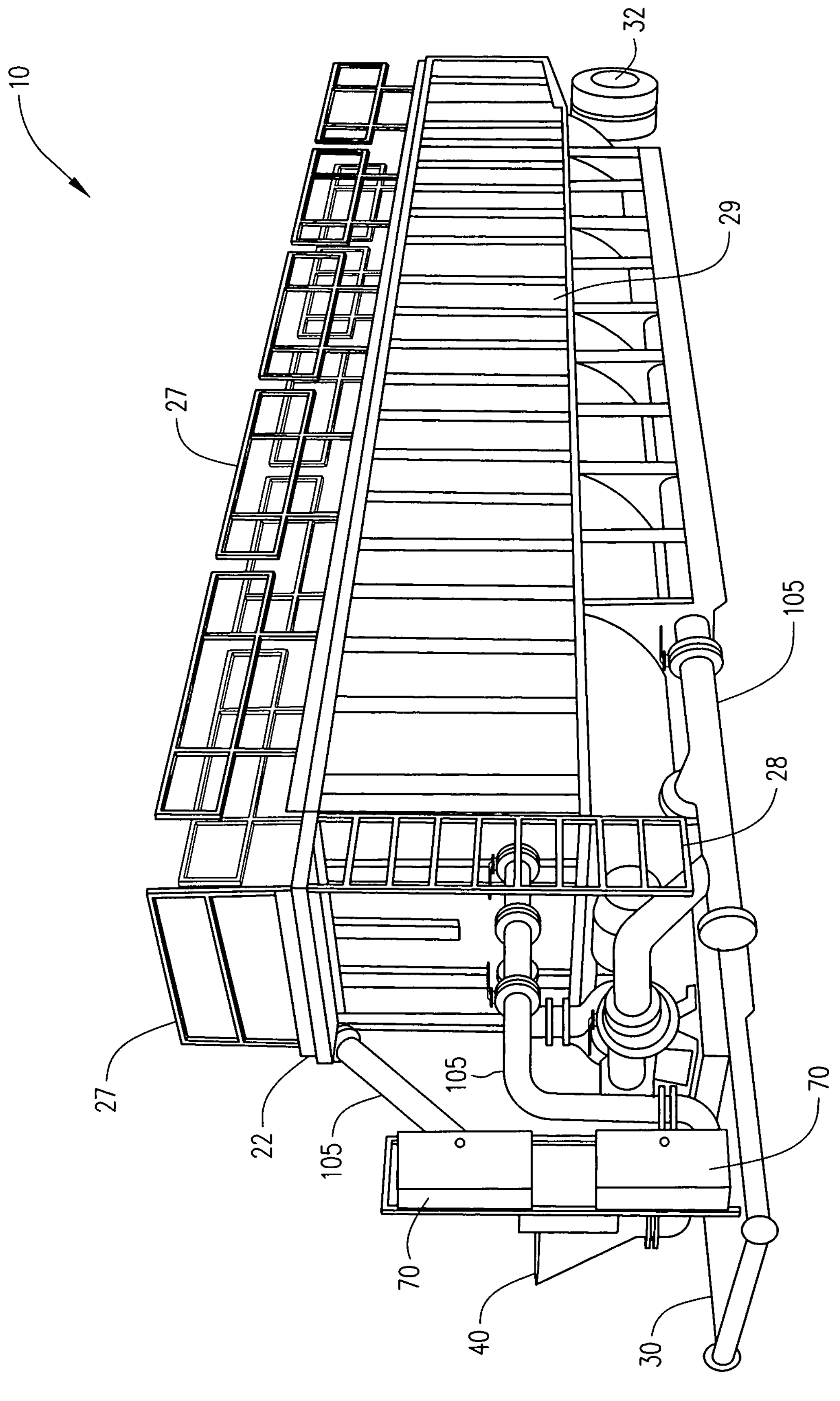
FIG. 2 is a front left side perspective view of the portable mud mixing station.
Figure 3:
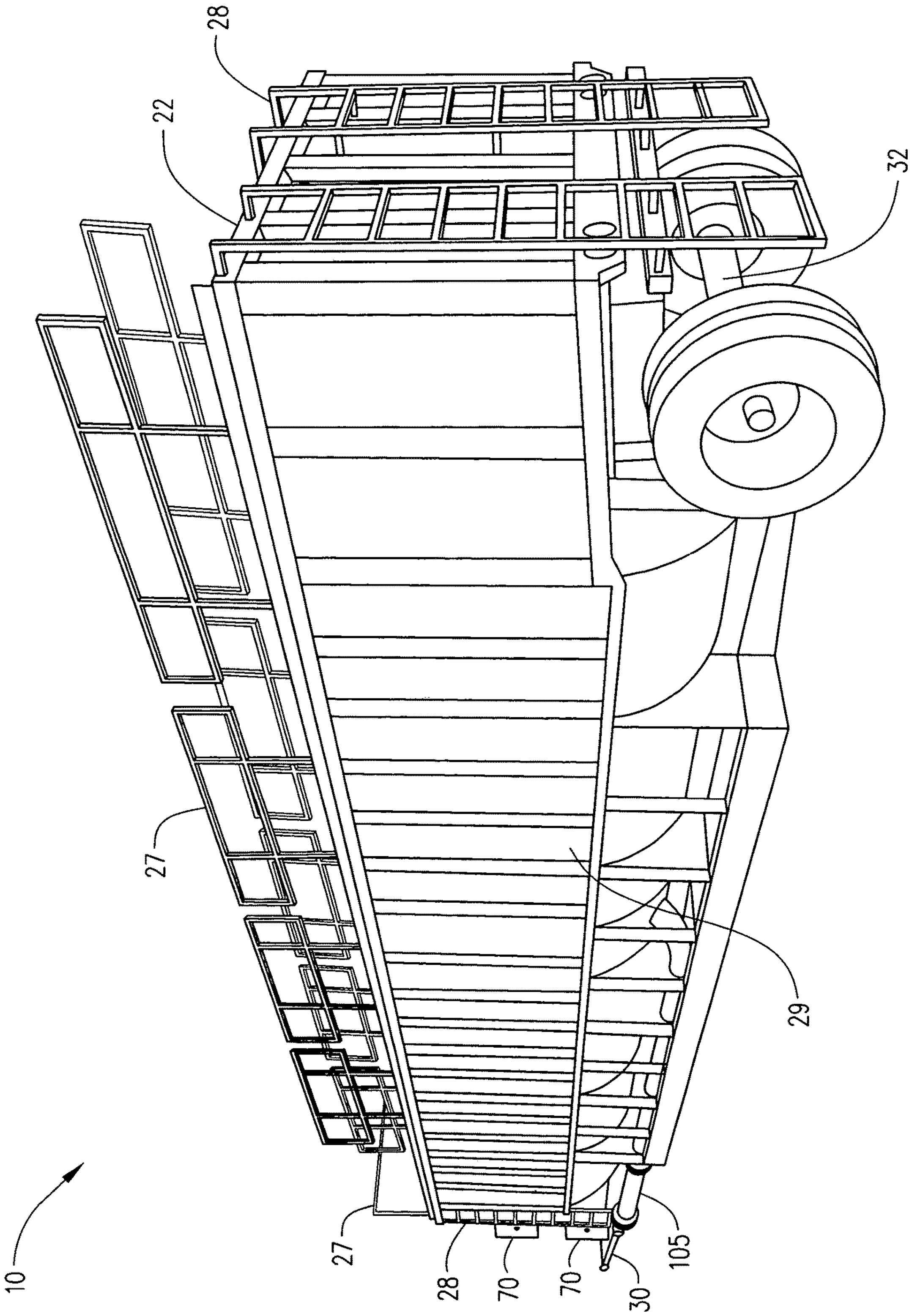
FIG. 3 is a left rear perspective view of the portable mud mixing station.
Figure 4:
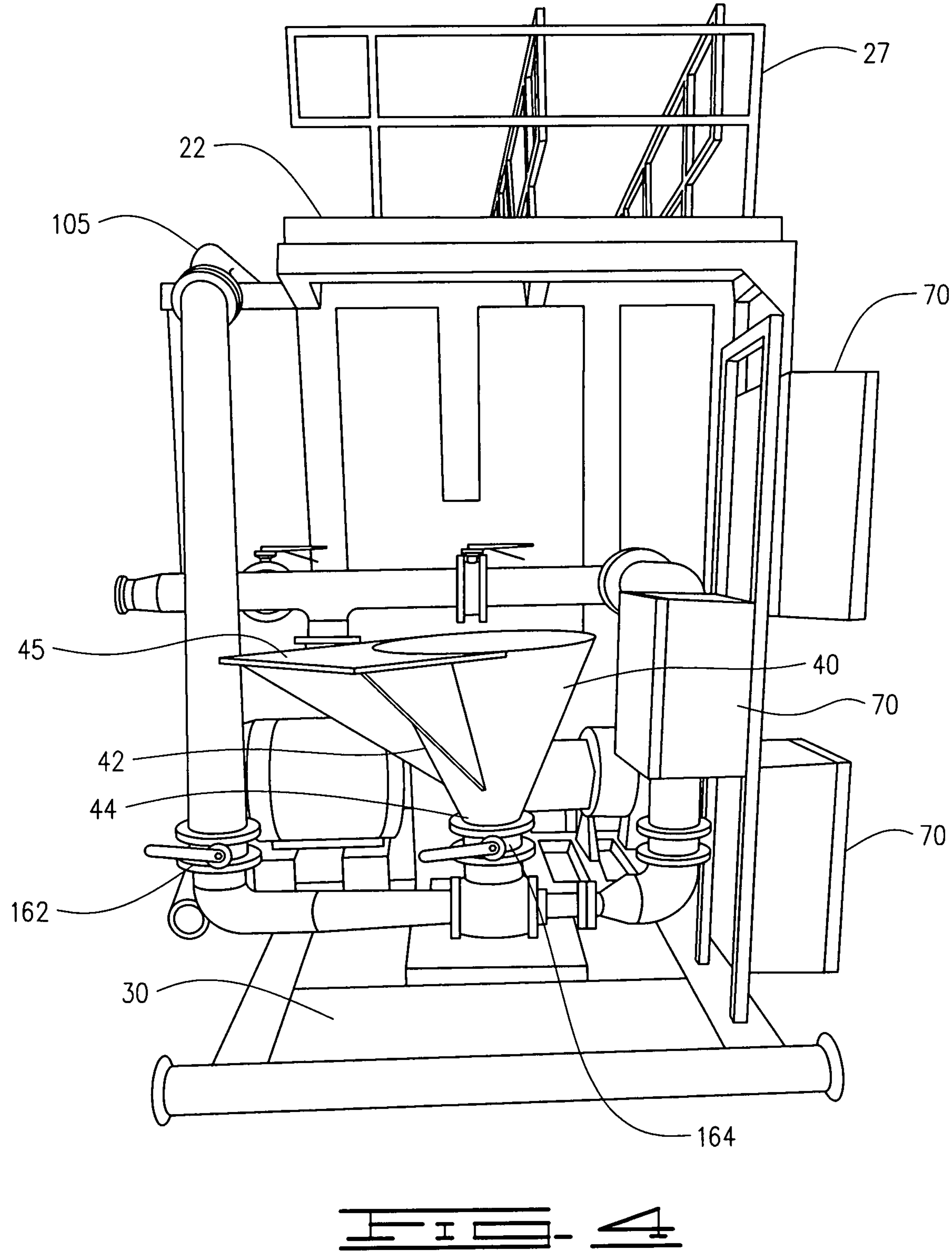
FIG. 4 is a front view of the mud mixing station.

A first embodiment external view of the mobile platform 20 is shown in FIGS. 1-4, with FIG. 1 illustrating the upper deck 22 with safety railing 27 which may be provided as retractable for lower clearance during transport, at least one ladder 28 access to the upper deck 22 and a front floor extension 30 upon which is mounted the additive hopper 40, a portion of the piping 105 and the electrical control center 70. FIG. 2 illustrates the first embodiment the mobile platform 20 showing the same elements, but from a different perspective for purpose of clarity. The rear of the mobile platform 20 is shown in FIG. 3, with the first embodiment presenting the mobile platform on as a trailer with a rear axle and wheels 32 and shown rear ladders 28 for additional access to the upper deck 22. The mobile platform which may also include skids instead of a rear axle and wheels, not shown. In FIG. 4, the same first embodiment is shown from the front to indicate the relationship and selected orientation of the additive hopper 40 and the electrical control center 70, along with related valves and piping which integrate the additive hopper 40 into the other components of the discharge piping assembly 100, FIG. 6.

Figure 7:
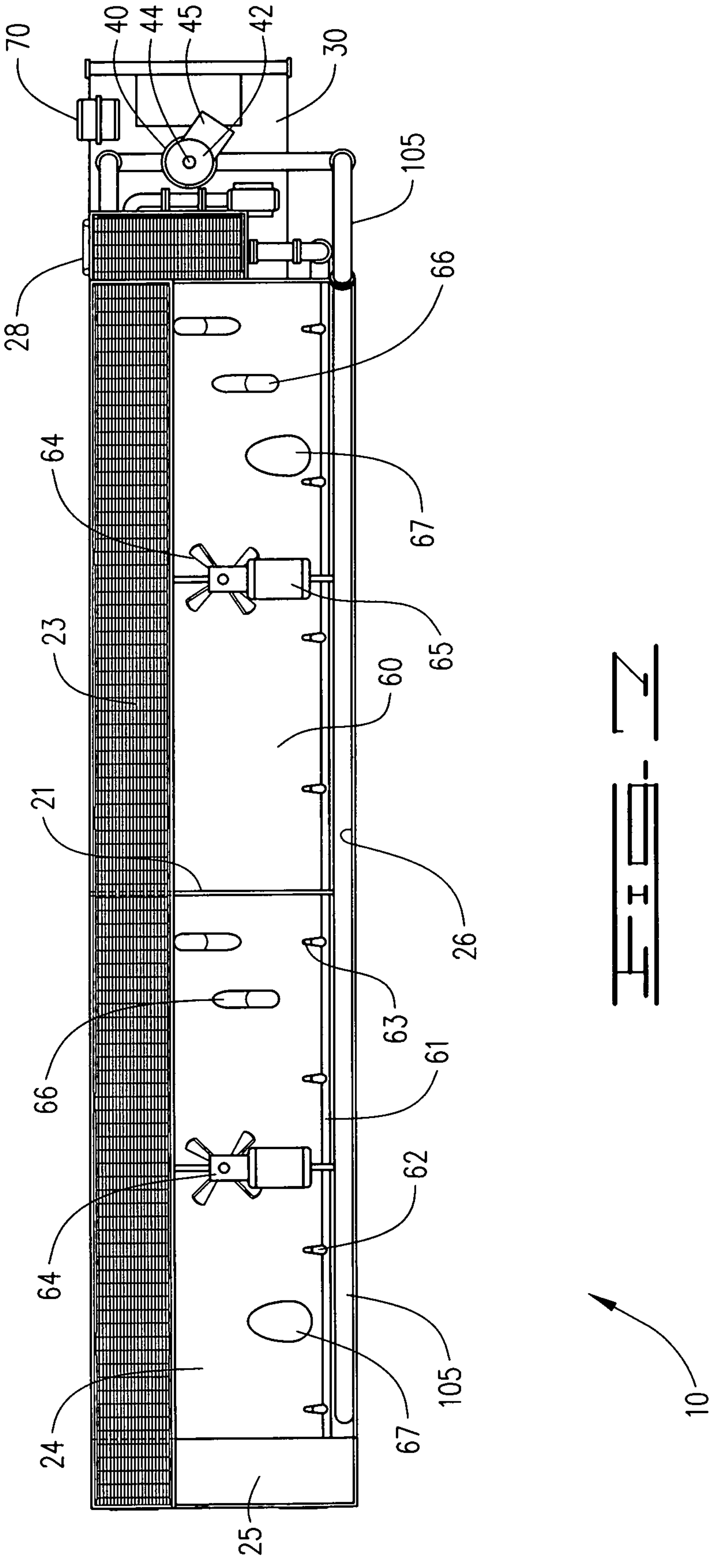
FIG. 7 is a top view of an embodiment of the portable mud mixing station without a top cover and indicating two mud mixing tanks oriented end-to-end.

As further disclosed, the portable mud mixing station 10 provides for the addition and blending of both wet and dry additives through the additive hopper 40, directing the additives in fluid through at least one tank gun 62 with a plurality of jet nozzles 63 and an agitator 64 for blending the liquid mixtures within the at least one tank 60, with two tanks 60 shown in FIG. 7, circulating the mixed additive fluids through at least one electrical pump 210, for further consistent homogeneous blending of the additive fluids within the drilling mud until being dispensed to a local production site. Optimally, the station provides a second independent and redundant pump 220, system and tank 60 to ensure continuous operation and fluid transfers in case of a pump or motor failure, as shown, in whole or in part, within FIGS. 5-6. A single tank version is contemplated within the scope of this portable mud mixing station as well as the two tank version shown in the drawing figures and disclosed in the specification.

The discharge piping assembly 100, as shown in FIG. 6 of the drawings illustrates a two tank embodiment, with a first tank 60 and second tank 60. Each tank 60 is optimally provided as a 2'×8'×8' by 20' tank length and approximately 100" wide tank, each tank 60 including an 8" outlet 66, 67, provided in at a lowest point at the front of the tanks down each tank to transport the drilling fluid and additive mixture through the discharge piping to a first tank gun 62 into the first tank 60 and a second tank gun 62 into the second tank 60. These tanks may be aligned side-by-side or end-to-end, as indicated in FIG. 7. This discharge piping assembly 100 provides for continuous circulation of the drilling fluids and additives within the assembly and selectively within each first tank 60 and/or second tank 60 or diversion to be dispensed and discharged through an 8" piping 105 array containing the various disclosed 8" butterfly valves, which may be manual or remote controlled, as defined in the discharge piping assembly 100 and the suction pining piping assembly 200. The valves and the piping may be altered as defined by the capacity and use of the portable mud mixing station as to diameter or even by the type of valves being used other than a butterfly valve.

The discharge piping assembly 100, in a first embodiment as disclosed in FIG. 7, further defines a first gun 62 injecting drilling fluids and additives through a first gun valve 118 into the first tank 60 with an agitator 64 stirring the tank contents by operation of an agitator motor 65, the first gun 62, in one embodiment, providing a manifold 61 with a plurality of jet nozzles 63 to enhance forceful injection into the tank 60. A second gun 62 injects drilling fluids and additives through a second gun valve 128 into the second tank 60 with a separate agitator 64 operated by a second agitator motor 65 stirring the tank contents, the second gun 62, in the same embodiment, providing a second manifold 61 with a plurality of jet nozzles 63 to enhance forceful injection into the second tank. From each respective first and second tanks 60, the drilling fluids and additives are diverted to an independent first drain stem 110 and second drain stem 120 in a lowest part of each respective tank through a respective first tank drain valve 112 and second tank drain valve 122, respectively, by piping 105 through a first discharge valve 114 to a first discharge outlet 116 and/or by piping 105 through a second discharge valve 124 independently controlled into a second discharge outlet 126. Alternatively, for recirculation of the drilling fluids and additives, the drilling fluid and additive mixture are joined through a crossover valve 130 to direct the circulating drilling fluid and additives back through the discharge piping assembly 100 for continued recirculation. The discharge piping assembly 100 also provides access from the additive hopper 40 through a hopper supply valve 164 into the discharge piping assembly 100 which is diverted directly to the first tank 60 and/or the second tank 60 through the selected respective first and/or second tank guns 62, FIGS. 4-6.

A first supply inlet 140 accepts drilling fluids through a first supply valve 142, while a second supply inlet 150 accepts drilling fluids through a second supply valve 152. The drilling fluids may be diverted through the selection of valves into the first tank 60 and/or the second tank 60. On either the first supply inlet 140 or the second supply inlet 150, the introduced drilling fluids may be diverted through closure of a hopper isolation valve 160 toward the additive hopper 40, diverted by closure of a hopper feed valve 162 to the first tank 60 and/or the second tank 60, or for continuous circulation, by opening the hopper supply valve 164 to expel the contents of the additive hopper 40 into the piping 105 and circulating fluids, and further opening the hopper isolation valve 160 and the hopper feed valve 162 for diversion of the drilling fluid and additive mixture from the first tank to the second tank, the first tank to the first tank, or from the second tank to the second tank. It is also contemplated within the scope of the discharge piping assembly 100 that more than one additive hopper 40 may be provided, with a separate hopper supply valve 164 emptying into the same piping, in which case one may be the dry additive hopper 40 and the other the wet additive hopper 40 to prevent clotting of the additive or caking within the respective additive hoppers 40 though not illustrated in the drawings. Where no additive is being blended with the drilling fluids, the drilling fluid may bypass the entire discharge piping assembly and flow directly from one or more supply inlets straight to one or more discharge valves, which could then deliver the drilling fluids, as well as the additive mixtures to the production site, with or without the additives.

Figure 5:
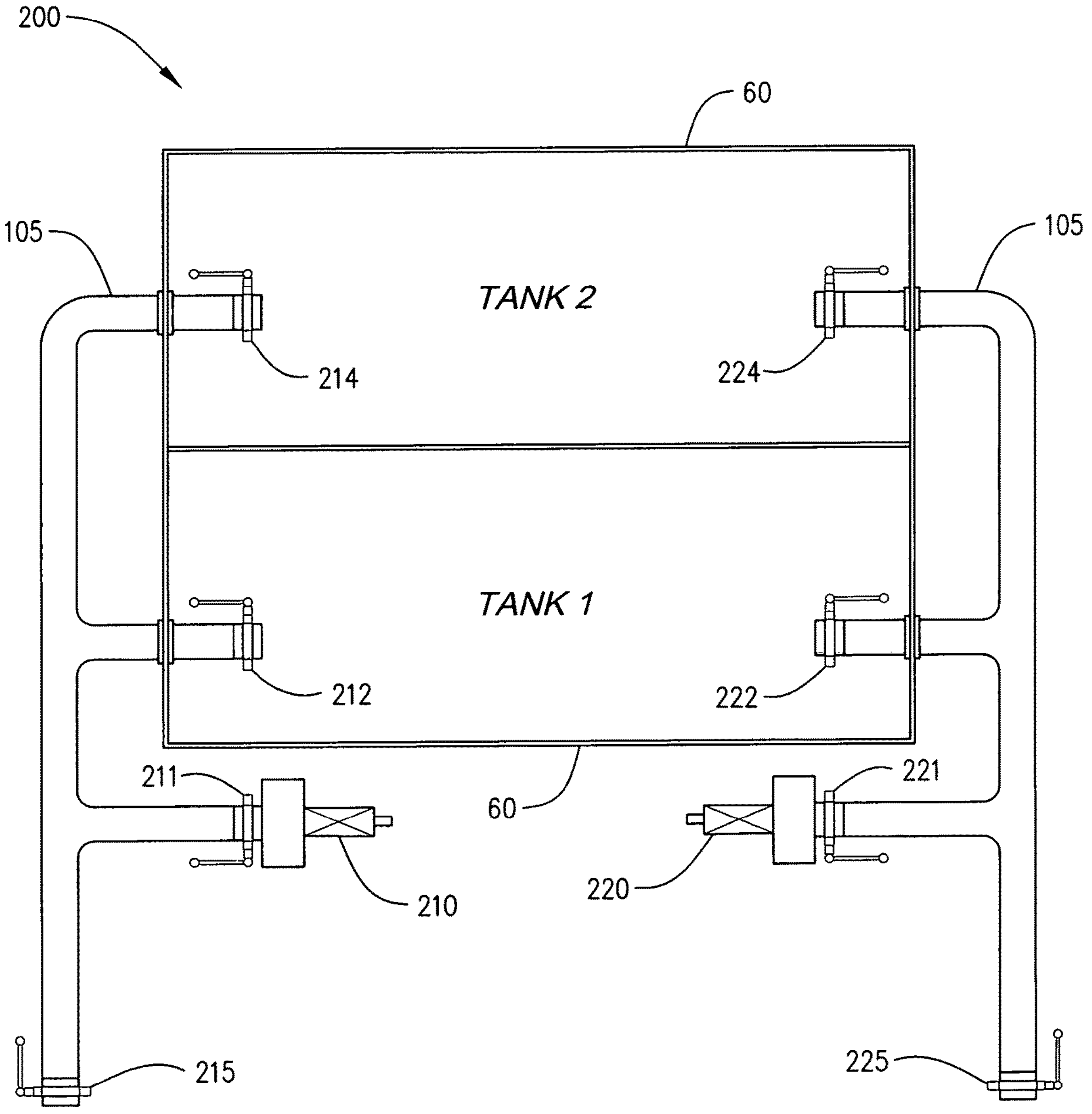
FIG. 5 is a diagram of an embodiment of the suction piping assembly.
Figure 5:
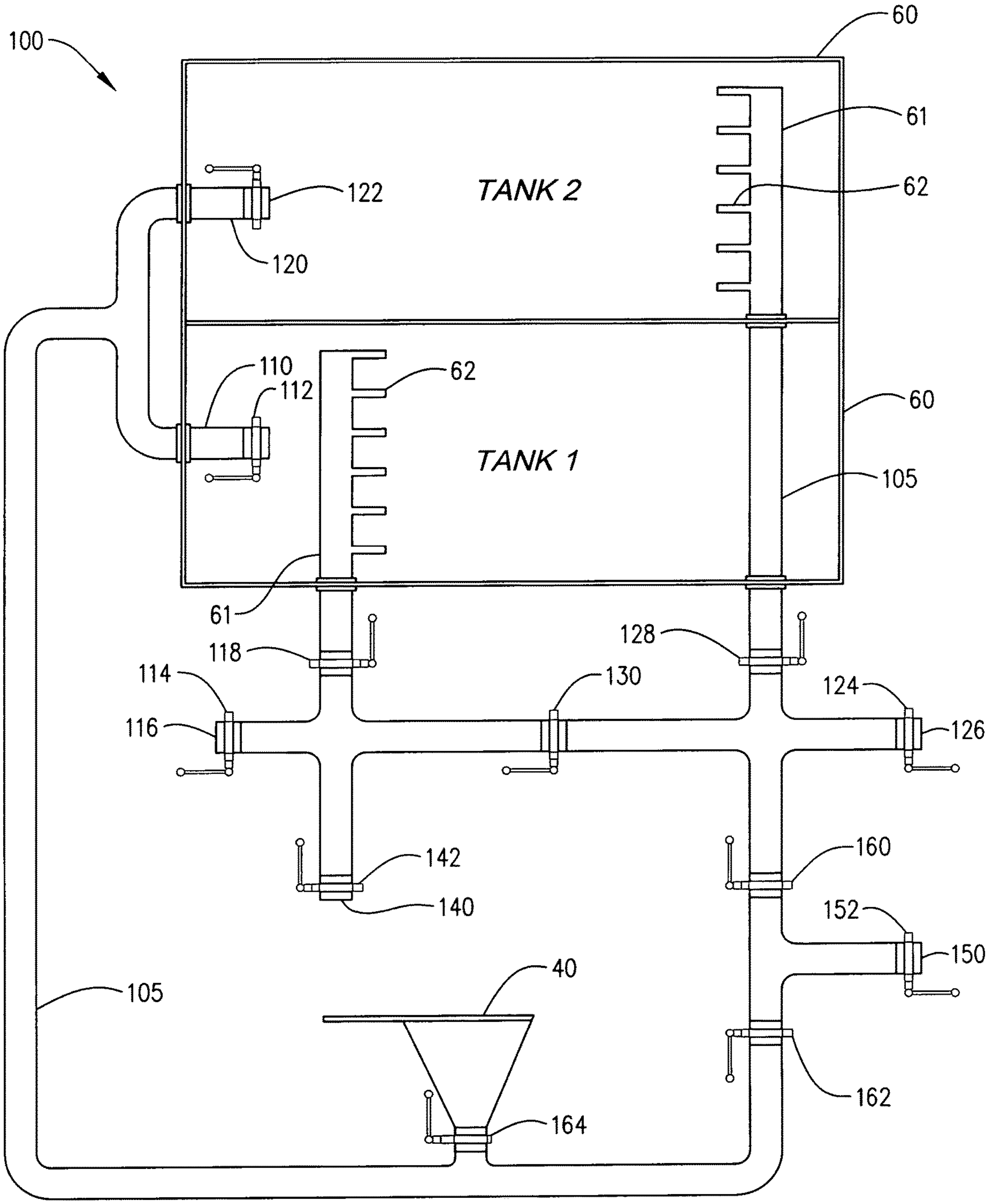

The suction piping assembly 200, as shown in FIG. 5 of the drawings, is disclosed in the first embodiment with two tanks. This suction piping assembly 200 is entirely independent from the discharge piping assembly 100. In the embodiment shown having two tanks 60, a first suction pump 210 with a first suction pump valve 211 compels mud mixture fluids through piping 105 from a pump one auxiliary suction inlet/drain valve 215 to the first tank 60 and the second tank 60 to a respective tank one isolation inlet valve 212 in mud tank one and a tank two isolation inlet valve 214 in tank two 60. A second suction pump 220 with a second suction pump valve 221 compels mud mixture fluids through piping 105 from a pump two auxiliary suction inlet/drain valve 225 as an inlet to the first tank 60 and second tank 60 to a respective tank one isolation outlet valve 222 in tank one and a tank two isolation outlet valve 224 in tank two 60. The mud mixture fluids may be directed to flow opposite by reversing the first and/or second suction pumps 210, 220, wherein the mud mixture fluids are drawn from the pump one auxiliary suction inlet/drain valve 215, or directed for expulsion through the pump two auxiliary suction inlet/drain valve 225, each first and second suction pumps 210, 220, being reversible for purposes of flow. This provide each tank 60 to be drained or filled independently or together from an outside source for continuous filling, mixing, and dispensing from the portable mud mixing station.

The preferred specification of the station components of the include at least on 360 bbl capacity mud mixing tank 60 or two 230 bbl mud mixing tanks 60, rear axle and wheels 32 beneath the mobile platform 20 for transport to a remote drilling site, the trailer enclosure 29 with the upper deck 27 and catwalk 23, at least one upper opening 24 into the interior 26 through the manway 25 providing entry to the inner platform floor 21 within the trailer enclosure 29 for system operation and valve access, and one or more external ladders 28 which lead from the ground to the upper deck 22. The suction pumps 210, 220, are ideally at least one ANSI pump with a hard iron fluid end including an impeller, a large bore stuffing box stainless steel shaft sleeve, premium bearings, and a tungsten carbide cartridge mechanical seal, mounted on a fabricated base with no less than a 75 HP, 1800 rpm, 3/60/230-460 volt, 365T frame 1.15SF explosion proof electrical motor, meeting Class 1, Division 2 specs. Each mud agitator 64 is ideally supplied as having a helical bevel gear box with a 10 HP, 60/230-460 volt explosion proof motor 65 direct drive couple-mounted to a gear box unit having a 42" impeller with keyless couplings. The mud mixing additive hopper 40 is ideally provided as at least a 6' mixing hopper with tapered sides 42 leading to a 6" discharge chute 44, 2" jet nozzle to introduce fluids into the hopper for clearance, and a butterfly hopper supply valve 164 with a handle to open and close the discharge chute 44 into the circulating discharge piping assembly 100 below, which is further directed to either the at least one mud mixing tank or another. The additive hopper would also include a table extension 45 for opening heavy bags of mixture materials and avoid having to suspend the bags directly over the additive hopper 40. The discharge piping assembly 100 is provided to receive drilling fluids, mix the intended additives in a preferred proportion and content, and circulate the mixed drilling fluids and additives into a homogeneous mixture with agitation, while the suction piping system 200 is intended to evacuate the mud mixing tank or tanks to the local drilling site. A plurality of connected piping, flow valves and pumps, supply lines, crossover isolations valves and discharge lines are integrated within the discharge piping assembly, all of which may be locally operated or remotely operated through the electrical control center 70, while the suction piping assembly 200 defines one or more suction pumps 210, 220, for circulation, draining and input of the fluids into, within and from the mud mixing tank or tanks. The discharge piping assembly 100 and suction piping assembly 200 operate independently, but work cooperatively to perform and complete the mixing of the mud fluids and additives into a homogeneous mixture.

In FIG. 7 of the drawings, an upper view of a tank is shown with the tank guns 62, multiple jet nozzles 63, the outlets, 66, 67, and agitators 64 with motors 65, this view observed from the catwalk 23 of the upper deck 22 through the upper opening 24. In FIG. 4 of the drawings, a front view of the portable mud mixing station 10 illustrates the additive hopper 40, the connecting piping 105, and the electrical control center 70.

In a single tank version, the piping, valves, motors, pumps and other components are reduced to provide basically half the components as disclosed in the two tank version, and absent the crossover valve, and without redundancy and also with a smaller profile that the one shown in the drawing figures in the mobile platform.

While the portable mud mixing station 10 has been particularly shown and described with reference to a preferred embodiment thereof, it will be understood by those skilled in the art that changes in form and detail may be made therein without departing from the spirit and scope of the invention.

What is claimed is:

1. A portable mud mixing station to add wet or dry additives to drilling mud and fluids prior to use in conjunction with oil and gas equipment, drilling operations and production, the portable mud mixing station comprising:

a mobile platform defining a platform floor, a trailer enclosure, an upper deck with a catwalk and at least one ladder leading up to the upper deck, the upper deck defining an opening and a manway providing access to the interior or the trailer enclosure, a safety railing around the upper deck, and a trailer floor extension, the trailer floor extension and platform floor supporting the portable mud mixing station;

an additive hopper mounting to the trailer floor extension, the additive hopper defining tapered sides, a discharge chute, the additive hopper accepting a wet or dry additive for blending and mixing said additives with said drilling mud and fluids;

at least one mud mixing tank mounted to the platform floor to contain said drilling mud and fluids and said additives, said mud mixing tank defining at least one tank outlet, above which is suspended an at least one agitator extending into said at least one mud mixing tank, with an electric motor, said at least one agitator compelled to stir said drilling mud and fluids and said additives of said at least one mud mixing tank into a homogeneous mixture;

a discharge piping assembly including a plurality of piping, valves, inlets and tank guns for receiving, mixing, and blending drilling mud and fluids and wet and dry additives dispensed through said hopper into a homogeneous mixture which is circulated by gravity-feed and force, and further dispensed through a plurality of outlets; and a suction piping assembly including a plurality of piping, valves, inlets and at least one suction pump forcefully compelling said drilling mud and fluids and additives from said at least one mud mixing tank and dispensed through drain valves.

2. The portable mud mixing station of claim 1 further comprising:

a rear axle and wheels under said mobile platform to provide transport to various locations;

an electric control center to provide a relay to said electric motor and said at least one suction pump;

a table attached to said additive hopper to support products added into said additive hopper; and at least one crossover valve located within said discharge piping assembly for receiving, circulating or dispensing the circulating drilling mud and fluids and additives.

3. A portable mud mixing station to add wet or dry additives to drilling mud and fluids prior to use in conjunction with oil and gas equipment, drilling operations and production, the portable mud mixing station comprising:

a mobile platform defining a platform floor, a trailer enclosure, an upper deck with a catwalk and at least one ladder leading up to the upper deck, the upper deck defining an opening and a manway providing access to the interior or the trailer enclosure, a safety railing around the upper deck, and a trailer floor extension, the trailer floor extension and platform floor supporting the portable mud mixing station;

an additive hopper mounting to the trailer floor extension, the additive hopper defining tapered sides, and a discharge chute, the additive hopper accepting a wet or dry additive for blending and mixing said additives with said drilling mud and fluids;

at least one mud mixing tank mounted to the platform floor to contain said drilling mud and fluids and said additives, said mud mixing tank defining at least one tank outlet, above which is suspended an at least one agitator extending into said at least one mud mixing tank, with an electric motor, said at least one agitator compelled to stir said drilling mud and fluids and said additives of said at least one mud mixing tank into a homogeneous mixture;

a discharge piping assembly defining piping throughout said assembly, said piping connecting a drain stem through a tank drain valve attached to a discharge outlet, said first drain stem attached to said at least one tank outlet, a hopper isolation valve and a hopper feed valve within the discharge piping assembly to control both forceful and gravity-flow of the drilling mud and fluids through the discharge piping assembly, with a hopper supply valve controlling dispensed contents from the additive hopper, and a gun valve located within the piping beyond the hopper isolation valve to supply the drilling mud and fluids and additives to a manifold which directs flow to a plurality of tank guns having jet nozzles to forcefully direct the drilling mud and fluids and additives into said at least one mud mixing tank where it is circulated and mixed by said agitator until such time as said drilling mud and fluids and additives are dispensed through said at least one tank outlet and further to said tank drain valve attached to said discharge outlet, a first and second discharge valve attached prior to a respective first and second discharge outlet exiting the trailer enclosure for dispensing the drilling mud and fluids and additives, and a first and second supply inlet having respective first and second supply valves to receive drilling mud and fluids into said discharge piping assembly for blending, mixing and circulation until such time and the drilling mud, fluids and additives are discharged for use in said drilling and production operations; and a suction piping assembly defining at least one suction pump forcefully compelling the drilling mud and fluids and additives throughout the suction piping assembly and discharge piping assembly in addition to gravity-flow, said suction piping assembly further defining assembly components including at least one suction pump valve, at least one isolation inlet valve attached to each at least one mud mixing tank, at least one isolation outlet valve attached to each at least one mud mixing tank, and at least one auxiliary suction inlet/drain valve which is opened to admit or dispense drilling mud and fluids into or from said suction piping assembly along with piping used to connect assembly components.

4. The portable mud mixing station of claim 3 further comprising:

a rear axle and wheels under said mobile platform to provide transport to various locations;

an electric control center to provide a relay to said electric motor and said at least one suction pump; and at least one crossover valve located within said discharge piping assembly for receiving, circulating or dispensing the circulating drilling mud and fluids and additives.

5. The portable mud mixing station of claim 3, further comprising:

said at least one mud mixing tank is no less than a 360 bbl capacity mud mixing tank or two 230 bbl mud mixing tanks;

said at least one suction pump is an ANSI-rated pump with a hard iron fluid end including an impeller, a large bore stuffing box stainless steel shaft sleeve, bearings, and a tungsten carbide cartridge mechanical seal, mounted on a fabricated base with no less than a 75 HP, 1800 rpm, 3/60/230-460 volt, 365T frame 1.15SF explosion proof electrical motor, meeting Class 1, Division 2 specs;

each said at least one agitator provides a helical bevel gear box and said electric motor is no less than a 10 HP, 60/230-460 volt explosion proof motor direct drive couple-mounted to said gear box unit having a 42" impeller with keyless coupling;

said additive hopper is at least a 6' mixing hopper with tapered sides leading to a 6" said discharge chute; and said hopper supply valve is a butterfly valve with a handle to open and close the discharge chute by gravity into said the circulating discharge piping assembly below, which is further directed to said at least one mud mixing tank; and said additive hopper further defines a table extension for opening and dispensing wet or dry additives into said additive hopper.

6. A portable mud mixing station to add wet or dry additives to drilling mud and fluids prior to use in conjunction with oil and gas equipment, drilling operations and production, the portable mud mixing station comprising:

a mobile platform defining a platform floor, a trailer enclosure, an upper deck with a catwalk and at least one ladder leading up to the upper deck, the upper deck defining an opening and a manway providing access to the interior or the trailer enclosure, a safety railing around the upper deck, and a trailer floor extension, the trailer floor extension and platform floor supporting the portable mud mixing station;

an additive hopper mounting to the trailer floor extension, the additive hopper defining tapered sides, a discharge chute and a table extension, the additive hopper accepting a wet or dry additive for blending and mixing said additives with said drilling mud and fluids;

two mud mixing tanks mounted to the platform floor to contain said drilling mud and fluids and said additives, each said mud mixing tank defining at least one tank outlet, above which is suspended an at least one agitator extending into said at least one mud mixing tank, with an electric motor, said at least one agitator compelled to stir said drilling mud and fluids and said additives of said at least one mud mixing tank into a homogeneous mixture;

a discharge piping assembly defining piping throughout said assembly, said piping connecting to a respective mud mixing tank by a first and second drain stem through a respective first and second tank drain valve attached to a respective first and second discharge outlet, said first drain stem attached to a respective first and second tank outlet, a hopper isolation valve and a hopper feed valve within the discharge piping assembly to control both forceful and gravity-flow of the drilling mud and fluids through the discharge piping assembly, with a hopper supply valve controlling dispensed contents from the additive hopper, and a respective first and second gun valve located within the piping beyond the hopper isolation valve to supply the drilling mud and fluids and additives to a respective manifold within each said mud mixing tank, each said tank gun directing flow to a plurality of tank guns within each respective mud mixing tank having jet nozzles to forcefully direct the drilling mud and fluids and additives into each said mud mixing tank where it is circulated and mixed by each respective said agitator until such time as said drilling mud and fluids and additives are dispensed independently through a respective first or second tank outlet and further to said tank drain valve attached to said discharge outlet, a first and second discharge valve attached prior to a respective first and second discharge outlet exiting the trailer enclosure for dispensing the drilling mud and fluids and additives, and a first and second supply inlet having respective first and second supply valve to receive drilling mud and fluids into said discharge piping assembly for blending, mixing and circulation until such time and the drilling mud, fluids and additives are discharged for use in said drilling operations and production; and a suction piping assembly defining at least one suction pump forcefully compelling the drilling mud and fluids and additives throughout the suction piping assembly and discharge piping assembly in addition to gravity-flow, said suction piping assembly further defining assembly components including at least one suction pump valve, a respective isolation inlet valve attached to each said mud mixing tank, a first and second isolation outlet valve attached to each said mud mixing tank, and a first and second auxiliary suction inlet/drain valve which is opened to admit or dispense drilling mud and fluids into or from either mud mixing tank or both mud mixing tank, with said piping used to connect assembly components.

7. The portable mud mixing station of claim 6 further comprising:

a rear axle and wheels under said electric mobile platform to provide transport to various locations;

an electric control center to provide a relay to said electric motor and said at least one suction pump;

and at least one crossover valve located within said discharge piping assembly for receiving, circulating or dispensing the circulating drilling mud and fluids and additives.

8. The portable mud mixing station of claim 6, further comprising:

said at least one mud mixing tank is no less than a 360 bbl capacity mud mixing tank or two 230 bbl mud mixing tanks;

said at least one suction pump is an ANSI-rated pump with a hard iron fluid end including an impeller, a large bore stuffing box stainless steel shaft sleeve, bearings, and a tungsten carbide cartridge mechanical seal, mounted on a fabricated base with no less than a 75 HP, 1800 rpm, 3/60/230-460 volt, 365T frame 1.15SF explosion proof electrical motor, meeting Class 1, Division 2 specs;

each said at least one agitator provides a helical bevel gear box and said electric motor is no less than a 10 HP, 60/230-460 volt explosion proof motor direct drive couple-mounted to said gear box unit having a 42" impeller with keyless coupling;

said additive hopper is at least a 6' mixing hopper with tapered sides leading to a 6" said discharge chute; and said hopper supply valve is a butterfly valve with a handle to open and close the discharge chute by gravity into said the circulating discharge piping assembly below, which is further directed to said at least one mud mixing tank; and said additive hopper further defines a table extension for opening and dispensing wet or dry additives into said additive hopper.

* * * * *